G. F. WHITE.
Dish-Washer.

No. 197,580. Patented Nov. 27, 1877.

WITNESSES:
E. Wolff
J. H. Scarborough.

INVENTOR:
G. F. White,
BY Munn & Co.
ATTORNEYS.

UNITED STATES PATENT OFFICE.

GEORGE F. WHITE, OF MIDDLETOWN, NEW YORK.

IMPROVEMENT IN DISH-WASHERS.

Specification forming part of Letters Patent No. 197,580, dated November 27, 1877; application filed October 10, 1877.

*To all whom it may concern:*

Figure 1:
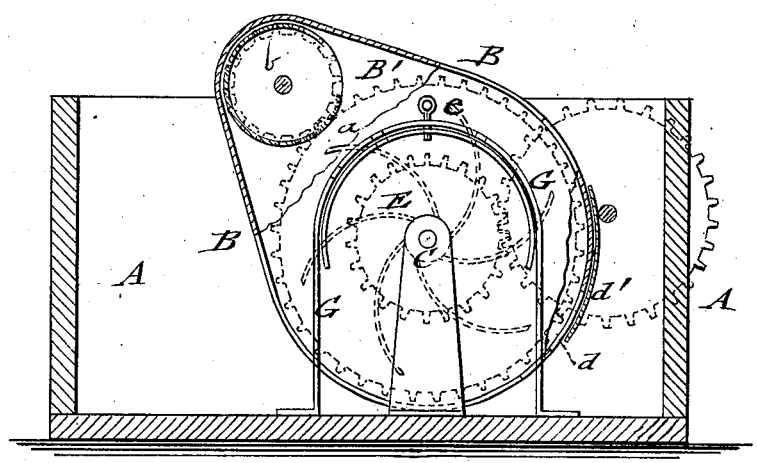
Figure 2:
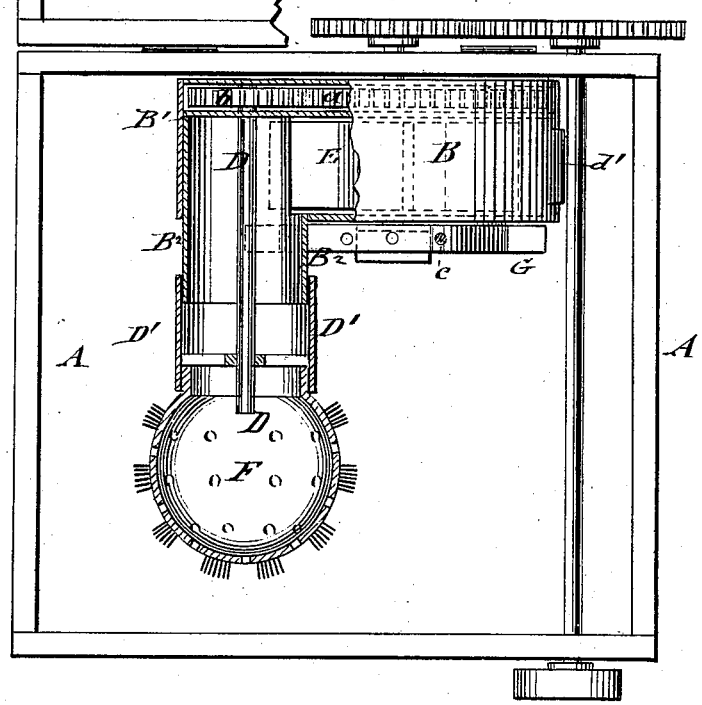

Be it known that I, GEORGE F. WHITE, of Middletown, in the county of Orange and State of New York, have invented a new and Improved Dish-Washer, of which the following is a specification:

In the accompanying drawings, Figure 1 represents a sectional front elevation of my improved dish-washer, and Fig. 2 a plan view of the same.

Similar letters of reference indicate corresponding parts.

This invention has reference to an improved dish-washing machine by which large and small dishes may be cleaned in rapid and easy manner, the machine being driven either by hand, foot, or power, as desired, and so arranged that every part of the dish may be exposed with equal facility to the action of the cleaning parts.

The invention consists of an adjustable casing with interior propeller-wheel, that takes up the water through a gaged opening of the casing, and throws it into a fixed tube at right angles to the casing, from which it passes, through a revolving tube fitted thereto and a perforated brush-head, onto the dishes. The casing is adjusted in the washer by means of a fixed perforated band and suitable locking devices.

Referring to the drawing, A represents a receptacle of suitable size and material, into which the hot water for cleaning the dishes is placed. At the inside of receptacle A is arranged a sheet-metal casing, B, which is supported on a revolving shaft, C, that passes laterally through the casing, and turns in bearings in an interior standard and of the wall of the receptacle, the shaft being extended to the outside of the receptacle, and revolved by suitable gearing worked by a hand-crank, treadle, or power.

The casing B is divided by a longitudinal partition, $B^1$, into two sections or chambers, of which the chamber nearest to the wall of the receptacle serves to place therein two intermeshing cog-wheels, $a$, $b$, of which one is keyed to the shaft C, while the other is keyed to a second revolving shaft or spindle, D, that turns in bearings in the casing B.

The second chamber contains a paddle-wheel, E, that is keyed to shaft C, and intended to take up the water from the receptacle through an opening, $d$, at the lower part of the casing, said opening being provided with a suitable gage, $d'$, to be opened more or less, according to the quantity of water desired to be thrown on the dishes.

The water is thrown by the paddle-wheel E into a fixed tube, $B^2$, in casing B, which tube extends at right angles to the casing B, and is arranged concentrically to the spindle D. To the front end of spindle D is rigidly applied, by fixed arms, a tube, $D'$, that is fitted around the fixed tube $B^2$, so as to turn easily thereon, the revolving tube $D'$ forming an extension of the fixed tube $B^2$, and taking water from the same.

To the end of the revolving tube $D'$ is attached a perforated brush head or wheel, F, preferably of convex shape, and with brushes of any suitable material which will fit readily any size of vessel.

The joint action of the revolving brush-head and of the water forced through the perforations of the same accomplishes the quick cleaning of the dish or other vessel placed against the brush head or wheel F.

A supporting-band, G, of U shape, is attached by brackets to the bottom of the receptacle, and extended over the larger part or a flange of casing B, that incloses the paddle-wheel. The band and support G are perforated to carry a bolt or other locking device, $e$, against which the upper part of the casing rests, admitting the locking of the casing into rigid position, at any suitable inclination, at one side or the other of the center line of the band G. The brush-head may thereby be raised above the level of the water conveniently for the dishes or vessels to be washed, which are jointly acted upon for being cleaned by the jets of water forced through the perforations of the head and by the scrubbing action of the brush.

The receptacle may be closed by a hinged or other lid after use, after having been emptied of water, and the casing lowered into the receptacle, and thus the entire machine readily stored away, being quickly available for use by adjusting the cleaning-head and casing in position on the supporting-band and revolving the crank-wheel for turning the paddle-wheel and brush-head.

Having thus described my invention, I claim as new and desire to secure by Letters Patent—

1. In a dish-washing machine, the combination of the adjustable casing B, having a fixed tube, $B^2$, the revolving perforated brush-head F, having a driving-shaft, D, and tube D', and the revolving paddle-wheel E with the water-receptacle A and suitable mechanism or gearing for actuating the brush-head and paddle-wheel, substantially as and for the purpose set forth.

2. The combination of the adjustable casing B, having a gaged entrance-opening for the water, fixed extension-tube $B^2$, and interior revolving paddle-wheel E with a tube, D', and brush head or wheel, attached thereto and revolved on the tube $B^2$ by a central spindle geared with the shaft of the paddle-wheel, substantially as specified.

3. The combination of the swinging casing B with a perforated band or support, G, of the dish-washer, and with a suitable locking device for securing the casing at any suitable inclination, substantially as and for the purpose described.

GEO. F. WHITE.

Witnesses:
 HENRY W. WIGGINS,
 D. L. CONKLING.